United States Patent [19]
Jenks

[11] 3,742,619
[45] July 3, 1973

[54] TEACHING AID

[76] Inventor: Nancy L. Jenks, 6214 Allott Avenue, Van Nuys, Calif. 91408

[22] Filed: June 29, 1972

[21] Appl. No.: 267,391

Related U.S. Application Data

[63] Continuation-in-part of Ser. No. 194,416, Nov. 1, 1971, abandoned.

[52] U.S. Cl. ................................. 35/30, 177/264
[51] Int. Cl. ........................................ G09b 23/02
[58] Field of Search ................. 35/1, 8, 24 C, 30, 35/31, 17, 18 R; 177/1, 190, 225, 245, 264

[56] References Cited
UNITED STATES PATENTS

| | | | |
|---|---|---|---|
| 784,145 | 3/1905 | Donecker | 35/30 |
| 1,950,072 | 3/1934 | Townsend | 35/31 R |
| 2,036,439 | 4/1936 | Schuster | 35/24 C |
| 2,066,809 | 1/1937 | Trent | 35/24 C |
| 2,393,162 | 1/1946 | Hayes | 35/24 C |
| 3,547,210 | 12/1970 | Zimmerman | 177/1 |
| 3,004,114 | 9/1961 | Orlov | 35/30 |
| 3,486,244 | 12/1969 | Horn | 35/31 R |

Primary Examiner—Wm. H. Grieb
Attorney—Jack C. Munro

[57] ABSTRACT

A device to visually represent to a student a multivariable mathematical equation which employs the use of a beam balance assembly which is connected to a supporting housing through a spring, the beam balance operating through a jointed pointer.

6 Claims, 3 Drawing Figures

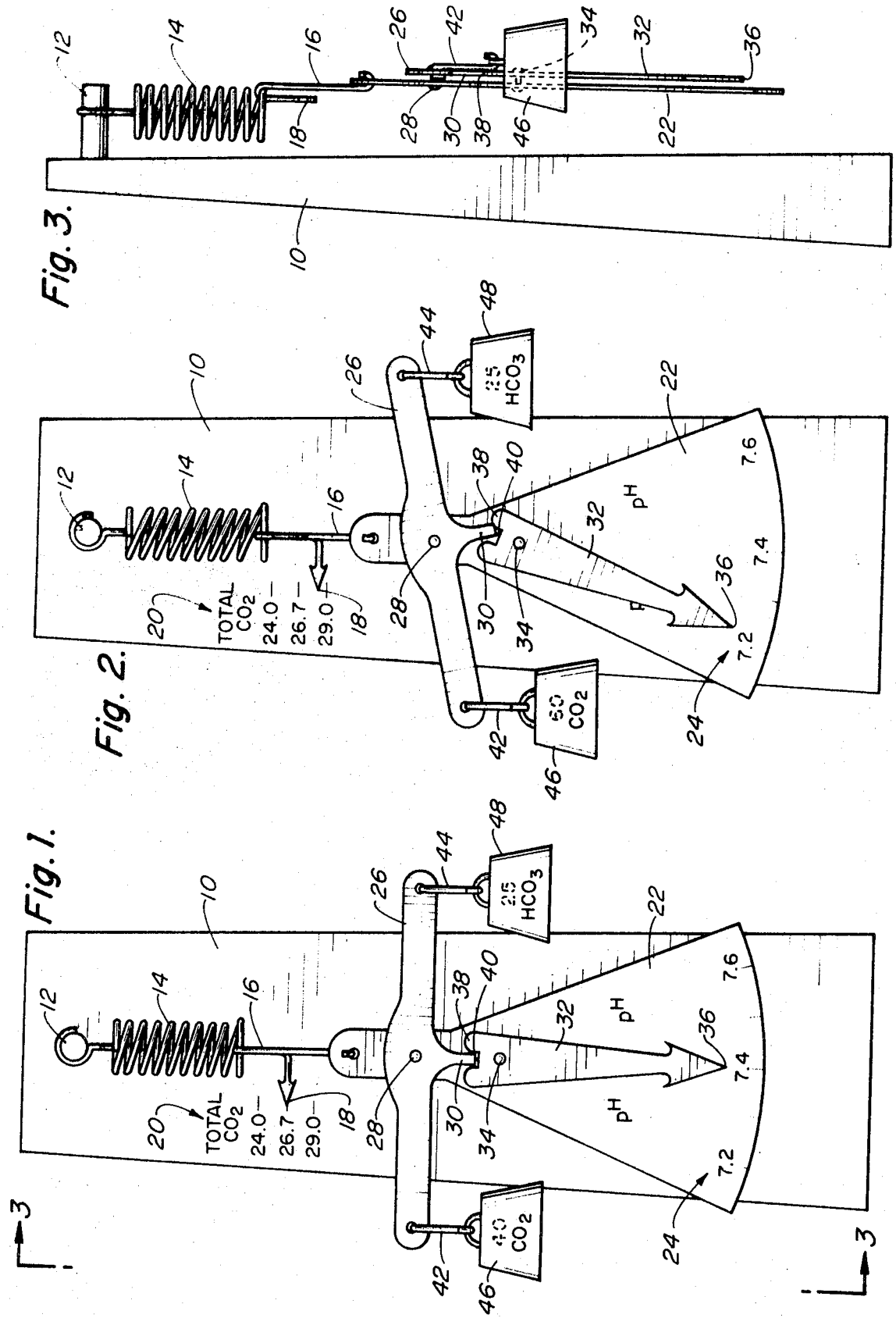

TEACHING AID

BACKGROUND OF THE INVENTION

This application is a continuation-in-part of Patent application Ser. No. 194,416, filed Nov. 1, 1971, now abandoned entitled BEAM BALANCE COMBINED WITH THE SPRING BALANCE AS MEANS OF ILLUSTRATING COMPLEX MATHEMATICAL RELATIONSHIPS.

In any technical field of endeavor, there are mathematical relationships which are known to be true. Certain mathematical equations are to represent a function or an operation of a particular overall structure. Such an overall structure could be a machine or could be the body of an animal.

In an animal body such as a human body there are certain gases which are dissolved within the blood. It has been found that these gases have a certain normal relationship with respect to each other, and that when the gases become inbalanced, the patient can become extremely ill and can even die. It has been discovered that the blood gas chemistry can be represented by "Henderson-Hasselbalch" equation. This equation is as follows:

$$pH = 6.1 + Log([HCO_3^-]/[CO_2])$$

It can be readily seen from the foregoing equation that as the quantity of the bicarbonate ($[HCO_3]$) or the carbon dioxide ($[CO_2]$) within the blood varies, the pH of the blood varies.

Additionally, it is found to be desirable to measure the total volume of carbon dioxide which is contained within the blood. It is desired that this particular quantity be maintained at a certain level for a normal person.

The understanding of the above referred to equation is necessary by people in the medical field in order to correctly diagnose certain illnesses. Blood gas chemistry, which is represented by the Henderson-Hasselbalch equation in relation to human physiology, is necessary by both doctors and nurses.

Normally nurses are not able to readily comprehend and understand relatively complex mathematical relationships. Therefore, it is desired that some device be employed to represent blood gas chemistry in a visual manner in relationship to human physiology which would permit the student to understand the relationship of the equation without actually comprehending such mathematically.

The human lungs are designed for a twofold purpose. That is, one to take in oxygen and pass such into the blood and two to eliminate carbon dioxide, the waste product. The lungs are actually designed to remove twenty times in volume more carbon dioxide than the volume of oxygen which is taken in.

In certain diseases the lungs tend to become obstructed, and not only is it difficult to take in oxygen, but it is also difficult to eliminate carbon dioxide. By the above quoted volume relationship between oxygen and carbon dioxide, if the lungs become obstructed, there is a greater buildup of carbon dioxide within the body which tends to prevent the intake of the amount of oxygen needed. The obstruction of lungs is extremely common in the disease known as emphysema. As the carbon dioxide builds up within the body, the pH of the body varies from the normal of 7.4. If the pH of the blood drops below 7.0 or exceeds 7.8, the patient will die very quickly. As the pH approaches these values, the patient becomes unconscious. Heretofore, a common treatment for such an unconscious patient would be to give the patient oxygen. However, although oxygen supplies the needed lack within the body of oxygen, the oxygen intake tends to further increase the amount of retained carbon dioxide. Therefore, in a relatively short time the patient can die because the wrong treatment was administered. The correct treatment would be to ventilate the patient. Ventilation entails mechanically forcing air into the lung to cause the lung to expand and contract which facilitates the removal of $CO_2$. This procedure permits the patient to dispose of excess carbon dioxide while at the same time increasing the intake of oxygen.

SUMMARY OF THE INVENTION

The primary objective of the device of this invention is to teach students blood gas chemistry in relation to human physiology so that incorrect diagnoses will be eliminated in relation to chronic obstructive diseases such as emphysema. Another objective of this invention is to employ a teaching aid to represent and understand a relatively complex mathematical equation to individuals whose mathematical backgrounds are either weak, or who have a low degree of interest in math.

The device of this invention employs the use of a supporting housing to which a beam balance assembly is movably attached thereto by means of a spring. The beam balance assembly includes a plate to which a crossarm has been pivotly mounted at the center point of its length. Attached at each end of the crossarm are weighted elements, one to represent carbon dioxide and the other to represent bicarbonate. A vertically disposed pointer is pivotly mounted upon the plate and is adapted to be moved by a portion of the crossarm. As the crossarm is tilted, the vertical pointer is caused to be moved toward the highest weight element. The movement of the vertical pointer also records the pH of the patient's blood as represented by the particular weight elements. As different weight elements are placed upon the crossarm, the entire beam balance assembly is moved vertically with respect to the supporting base. This movement is used to represent the total volume of carbon dioxide contained within the patient's blood which has the amounts of carbon dioxide and bicarbonate as represented by the weight elements attached to the crossarm.

BRIEF DESCRIPTION OF THE DRAWING

FIG. 1 is a front view of the teaching aid device of this invention showing such in a balanced configuration;

FIG. 2 is a view similar to FIG. 1 but where the patient has encountered an imbalance relationship between carbon dioxide and bicarbonate; and FIG. 3 is a side view of the device of this invention taken along line 3 — 3 of FIG. 1.

DETAILED DESCRIPTION OF THE SHOWN EMBODIMENT

Referring particularly to the drawing, there is shown the supporting base 10 which will normally be an upright stanchion, a wall of a structure, or some other similar apparatus. A pin 12 is secured to the supporting base 10 and extends therefrom. One end of a coil spring 14 is connected to the pin 12. A wire 16 is attached to the free end of the spring 14 with the wire 16 including a horizontal pointer 18. The pointer 18 is to be located directly adjacent indicia 20 which is located upon the supporting base 10. The indicia 20 is to represent the total amount of carbon dioxide contained within a patient's blood.

The free end of the wire 16 is connected to a plate 22. The plate 22 is shown to be substantially triangular in configuration with indicia 24 being located upon this lower edge. The indicia 24 is to represent the pH of a patient's blood.

An elongated crossarm 26 is pivotly attached at its midpoint by a pivot pin 28 to the plate 22. Located adjacent the pivot pin 28, the crossarm 26 has formed integral therewith an extension 30.

A vertical pointer 32 is pivotly connected by a pivot pin 34 to the plate 22. The vertical pointer 32 includes a sharpened end 36 and an aft end 38. The aft end 38 includes a recess 40. The recess 40 is adapted to cooperate with the extension 30.

As the crossarm 26 is tilted counter-clockwise as shown in FIG. 2 of the drawing, the pointer 32 is pivoted clockwise about the pivot pin 34. In a similar manner, if the crossarm were tilted clockwise, the pointer 32 would be moved counter-clockwise.

Attached within apertures formed at each end of the crossarm 26 are supporting rods 42 and 44. Each of the supporting rods 42 and 44 include a hook section at its free end. The hook section of rod 42 is to support weight element 46. In a similar manner the hook section of rod 44 is to support a weight element 48.

The weight elements 46 and 48 are to be physically weighted. A number of different weighted weight elements 46 and 48 are to be used. In FIG. 1, the normal relationship for arterial blood is shown of 40 millimeters of mercury of $CO_2$ and 25 milli-mols per liter of $HCO_3^-$. In FIG. 2, an imbalance is depicted of 60 millimeters of mercury of $CO_2$ and 25 milli-mols per liter of $HCO_3^-$. The weight element 46 is physically heavier in FIG. 2 than in FIG. 1.

The manner in which the teaching aid of this device is to be employed is as follows: In FIG. 1 of the drawing, the device of this invention depicts what is to be considered a normal balanced relationship between $CO_2$ and $HCO_3^-$. This normal relationship gives a total carbon dioxide concentration of 26.7 milli-mols per liter of blood. The significance of this figure will become more apparent further on in the description.

To demonstrate a condition of imbalance within a patient, such condition being representative of a chronic obstructive lung such as what occurs in emphysema, the pressure of carbon dioxide increases. This increased carbon dioxide can be represented by an increased weight element 46 which is to be located upon a rod 42. This causes the cross beam 26 to tilt counter-clockwise as shown in FIG. 2 of the drawing. As a result the second pointer 32 is moved counter-clockwise until the sharpened end 36 represents an abnormal pH of the blood. The sharpened end 36 of the second pointer 32 has been moved clockwise to represent a figure of approximately 7.2 pH.

The normal pH of the blood is 7.4. If this pH varies only slightly, the patient does become quite ill. If the pH drops below 7.0 the patient will normally be dead in a matter of a few minutes. At approximately 7.2 the patient will become unconscious.

As can be readily seen from FIG. 2 of the drawing, this imbalance can be corrected by merely adding additional bicarbonate into the patient's blood, which is normally accomplished by the kidneys retaining bicarbonate. Bicarbonate is represented by weight element 48 and the students can readily observe that by locating a particular physically heavier weight element 48 upon the rod 44 that the cross beam 26 will tend to become balanced again which causes the second pointer 32 to again be located adjacent the normal pH value of 7.4. This can tend to give the student the false impression that the patient's blood chemistry is in proper alignment. Such is not the case since there are both at this time increased amounts of carbon dioxide and bicarbonate. However, this increased amount is represented by the pointer 18 which is moved lower to represent a higher figure of total carbon dioxide. Therefore, it becomes known to the student that the blood chemistry of the patient may appear to be in proper balance when in reality it is not. Therefore, the patient must incur further treatment to lower the total amount of carbon dioxide within the system.

The adding of bicarbonate to a person's blood is normally done only in extreme instances. The correct procedure is to ventilate the patient which causes the patient to slowly decrease the level of carbon dioxide within his blood. The lowering of the carbon dioxide slowly increases the pH to approximately the 7.4 normal value.

Bicarbonate, which is represented by weight element 48, is excreted from the body through the use of the kidneys. The device of this invention can also be used to depict what occurs within a person's system when the bicarbonate increases to undesired proportions due to kidney failure.

Actually the device of this invention can be used to represent any mathematical relationship such as $A=B/C$ and $D=B+C$. $A$ in the foregoing example represents pH. $B$ represents bicarbonate dissolved in the blood. $C$ represents $CO_2$ dissolved in the blood. $D$ represents the total amount of $CO_2$ from both sources ($B$ and $C$). Therefore, the device of this invention can be employed to represent other mathematical relationships other than the Henderson-Hasselbalch equation.

I claim:
1. A teaching aid comprising:
a supporting base;
a plate connected by a first means to said supporting base, said first means to permit movement of said plate relative to said base;
a crossarm pivotally connected to said plate;
a first weighted element supportedly connected to said cross arm at one end thereof, a second weighted element supportedly connected to said crossarm at the opposite end thereof, both said first weighted element and said second weighted element being changeable; and
a first pointer pivotally connected to said plate, second means connecting said first pointer and said crossarm to cause said first pointer to pivot in a direction opposite to the pivoting of said crossarm determined by the value of physical weight of said first and said second weighted elements located on said crossarm, first indicia located upon said plate adjacent said first pointer, said first pointer being movable across said first indicia whereby during pivoting of said first pointer different values of said first indicia are represented by said first pointer.

2. A teaching aid comprising:
a supporting base;
a plate connected by a first means to said supporting base, said first means to permit movement of said plate relative to said base;
a crossarm pivotally connected to said plate;
a weighted element supportedly connected to said crossarm at each end thereof;
a first pointer pivotally connected to said plate, second means connecting said first pointer and said crossarm to cause said first pointer to pivot in a direction opposite to the pivoting of said crossarm;
said first pointer including a sharpened end, first indicia located upon said plate adjacent said sharpened end, said sharpened end being movable across said first indicia during pivoting of said first pointer to thereby represent different values of said first indicia; and
there being a plurality of different weighted elements, each of said weighted elements being physically weighted differently, only one of said weighted elements to be connected at a time to an end of said crossarm.

3. The teaching aid as defined in claim 2 wherein:
said first means includes a coil spring, whereby as heavier weighted elements are located upon said crossarm said coil spring is caused to expand.

4. The teaching aid as defined in claim 3 wherein:
said first means to further include a connecting wire between said plate and said spring, said connecting wire including a second pointer, said second pointer being located adjacent a particular area upon said supporting base, second indicia located within said particular area upon said supporting base, whereby the second pointer is to represent different values of said second indicia as it moves with respect to said supporting base.

5. The teaching aid as defined in claim 4 wherein:
said first pointer includes a recess, said crossarm including an extension attached thereto, said extension to be positioned within said recess.

6. The teaching aid as defined in claim 5 wherein;
said extension being located adjacent the longitudinal midpoint of said crossarm, said extension being an integral part of said crossarm.

* * * * *